Inventor
Gregor Jonsson
By Olson, Trexler, Wolters & Bushnell attys.

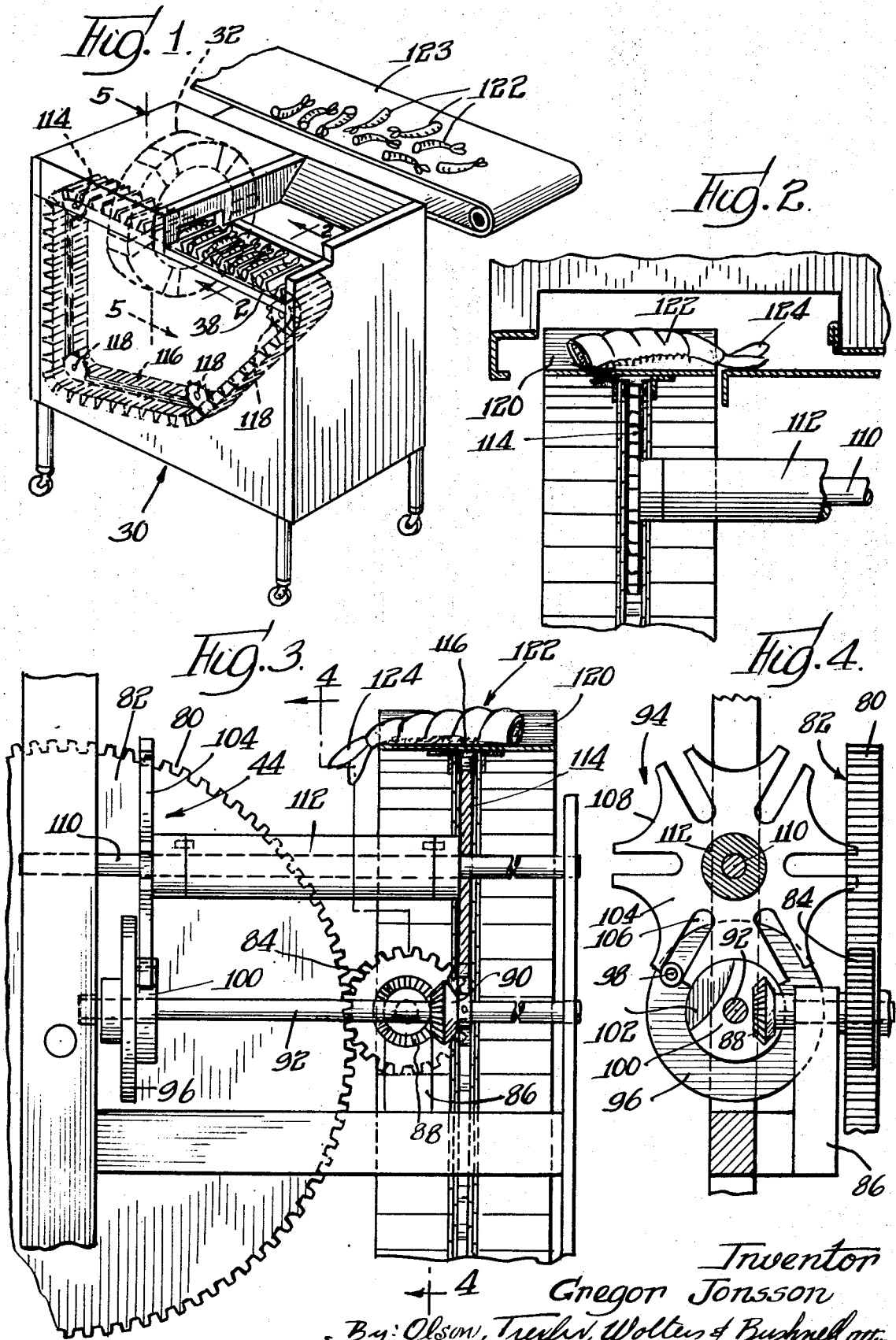

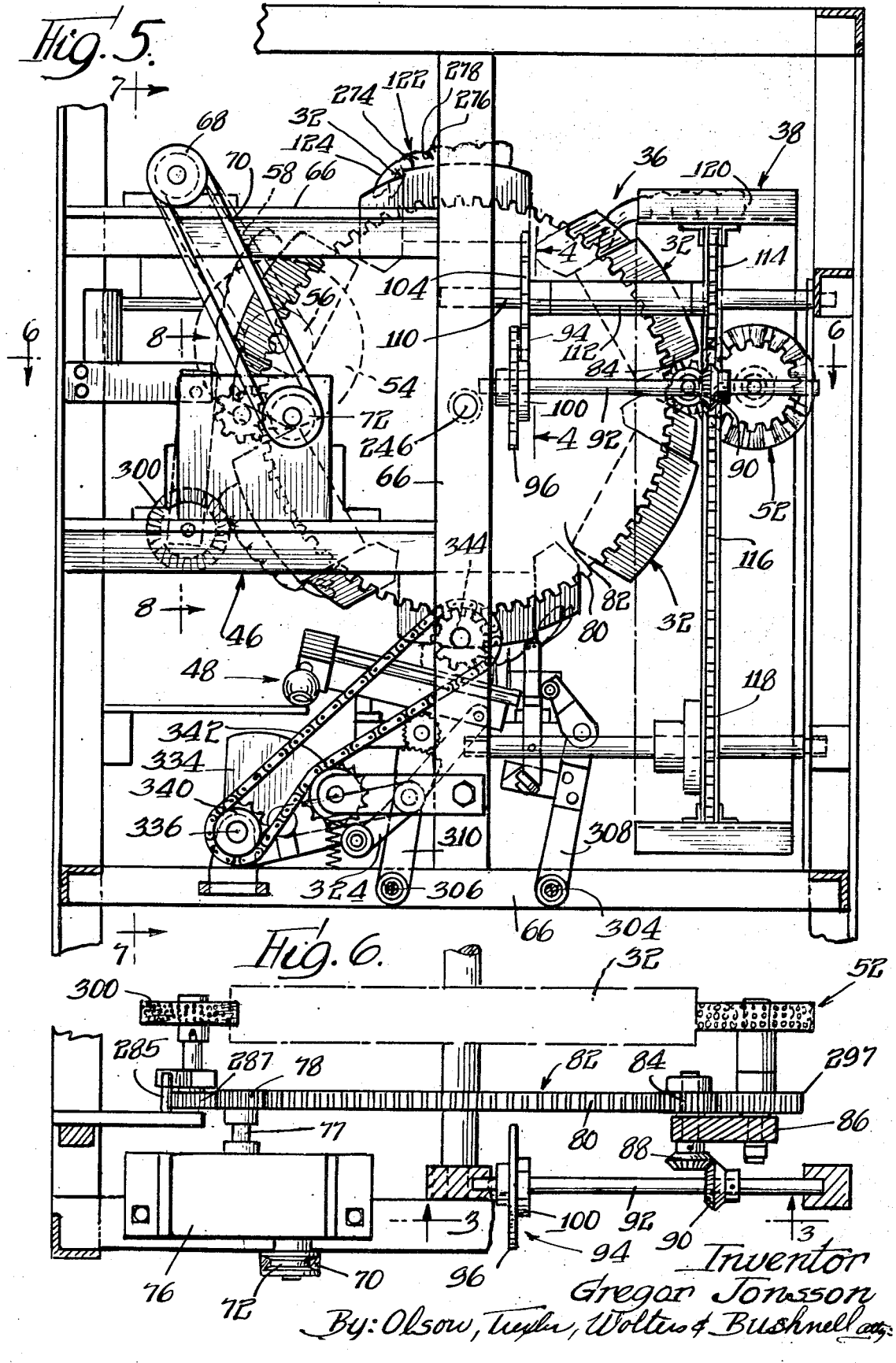

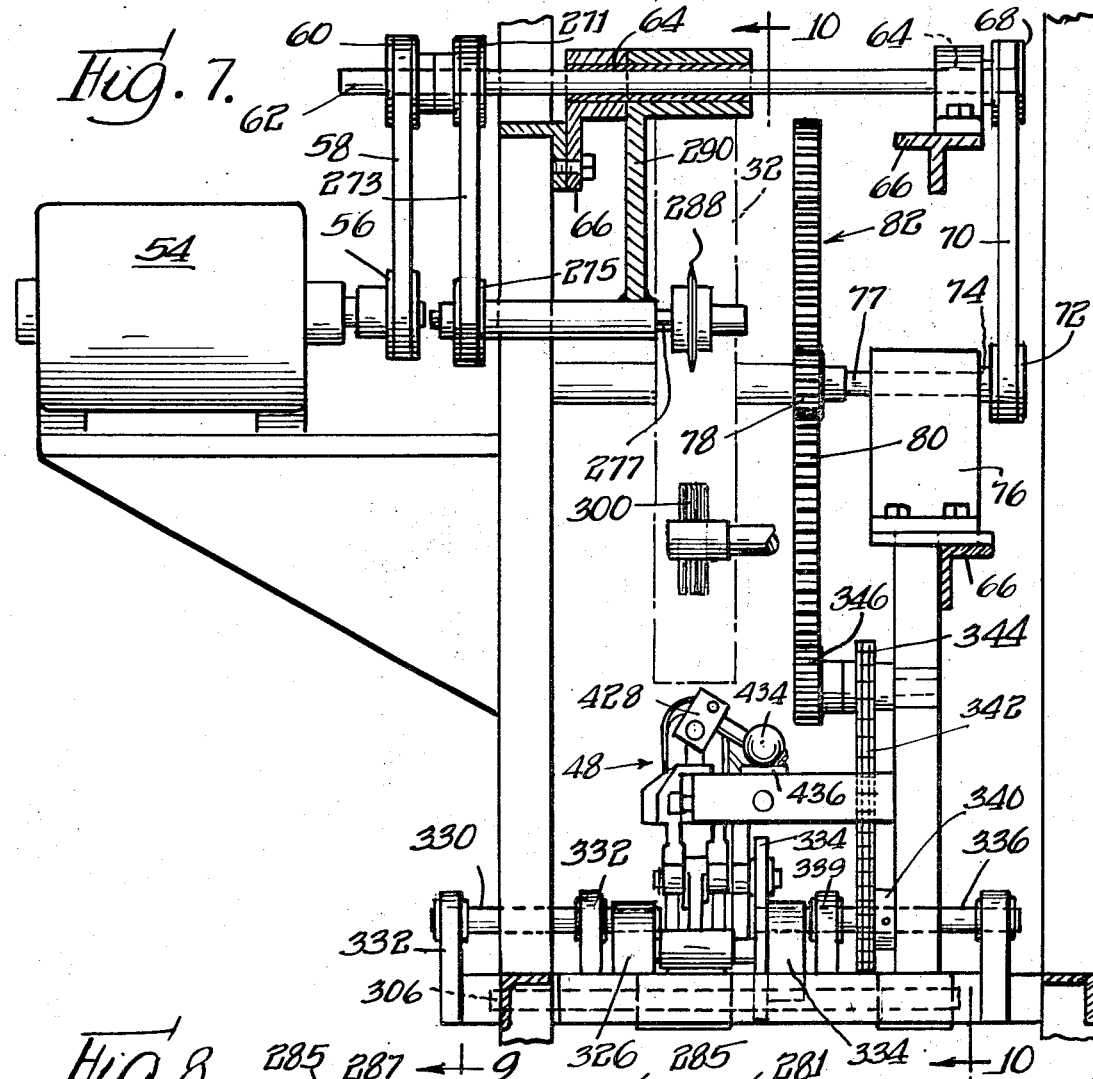

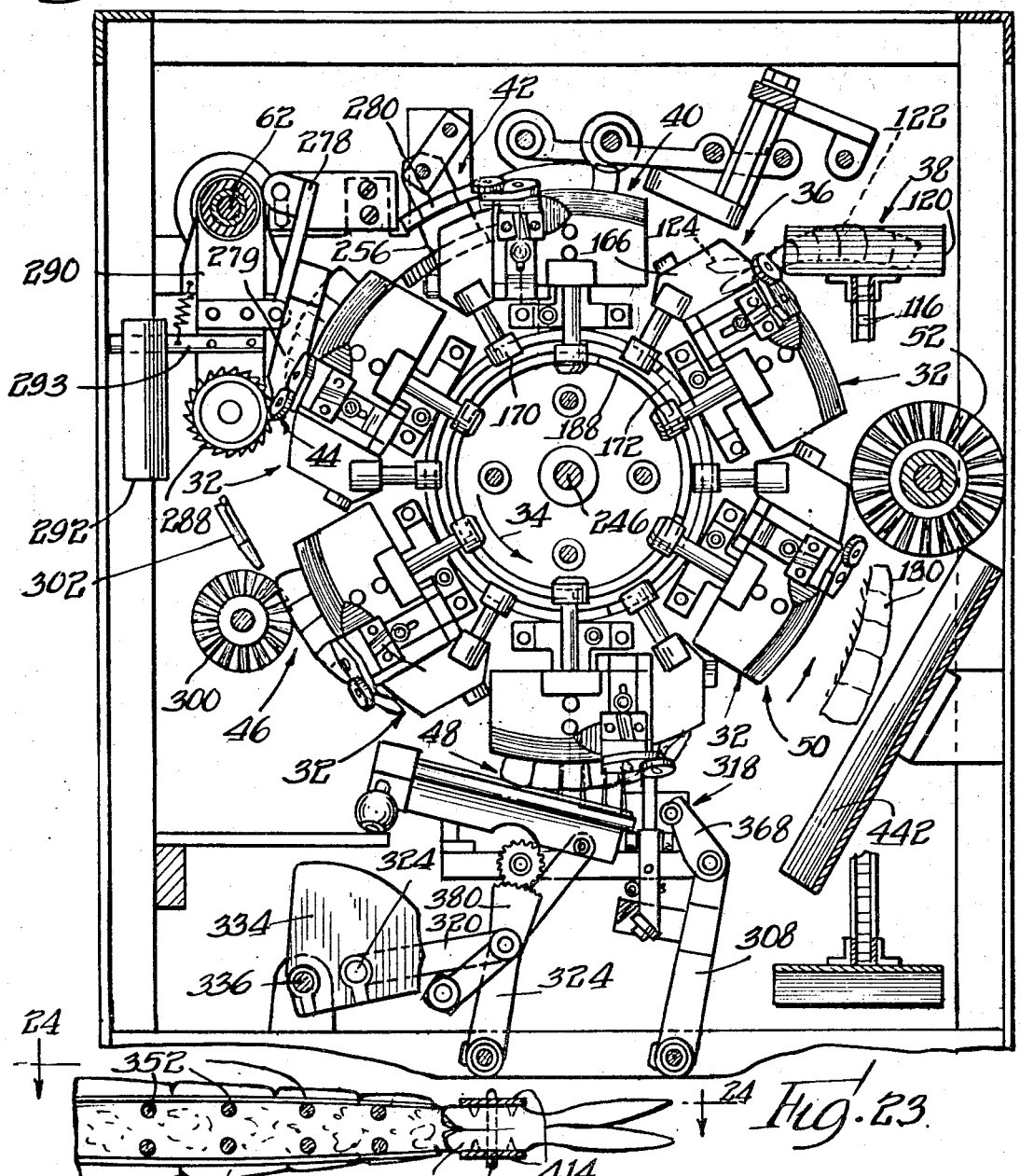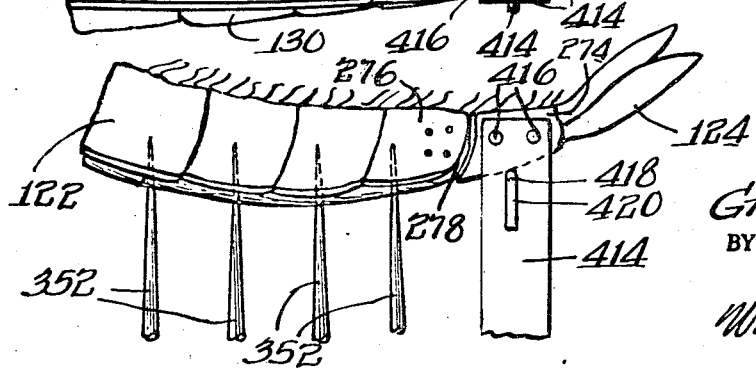

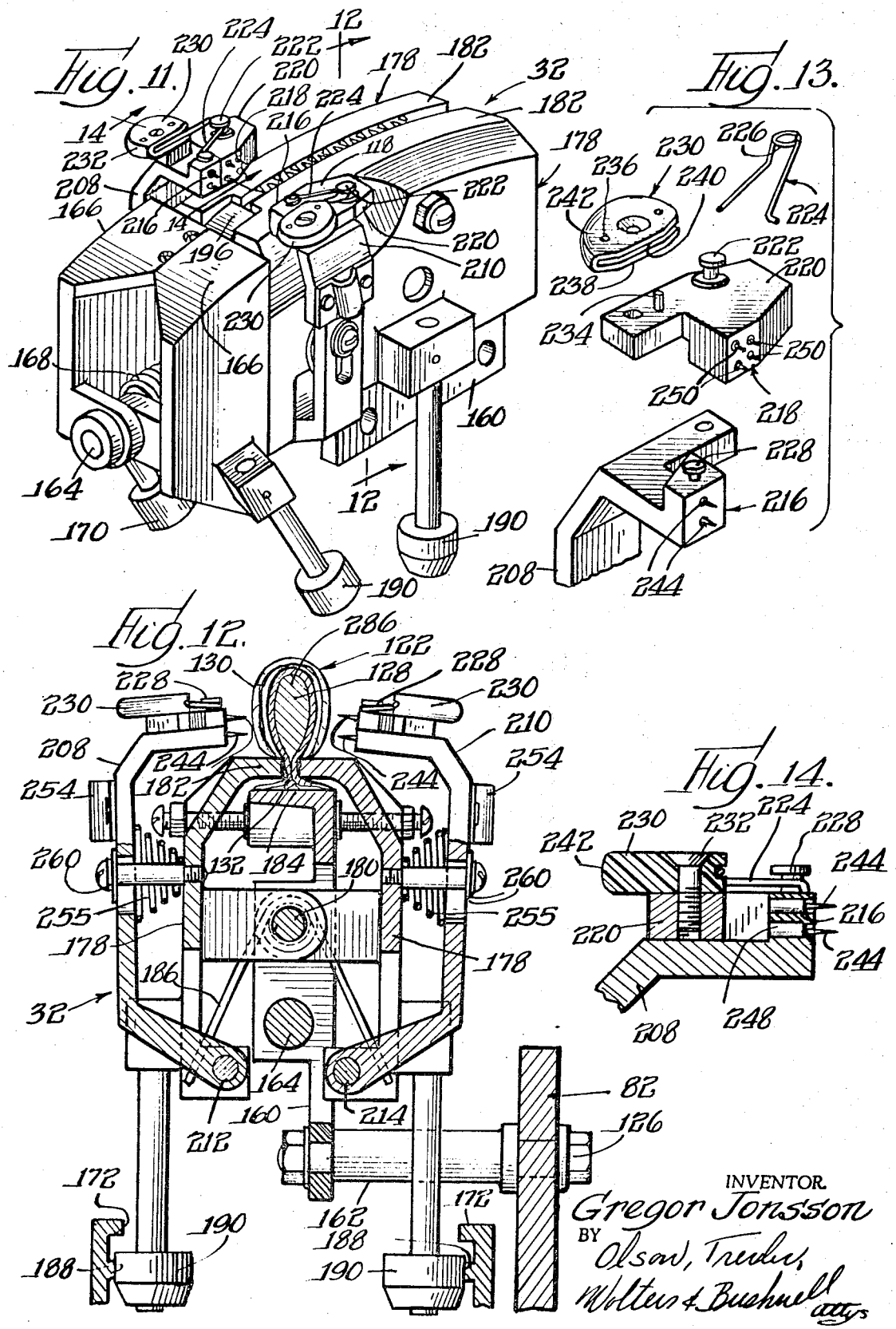

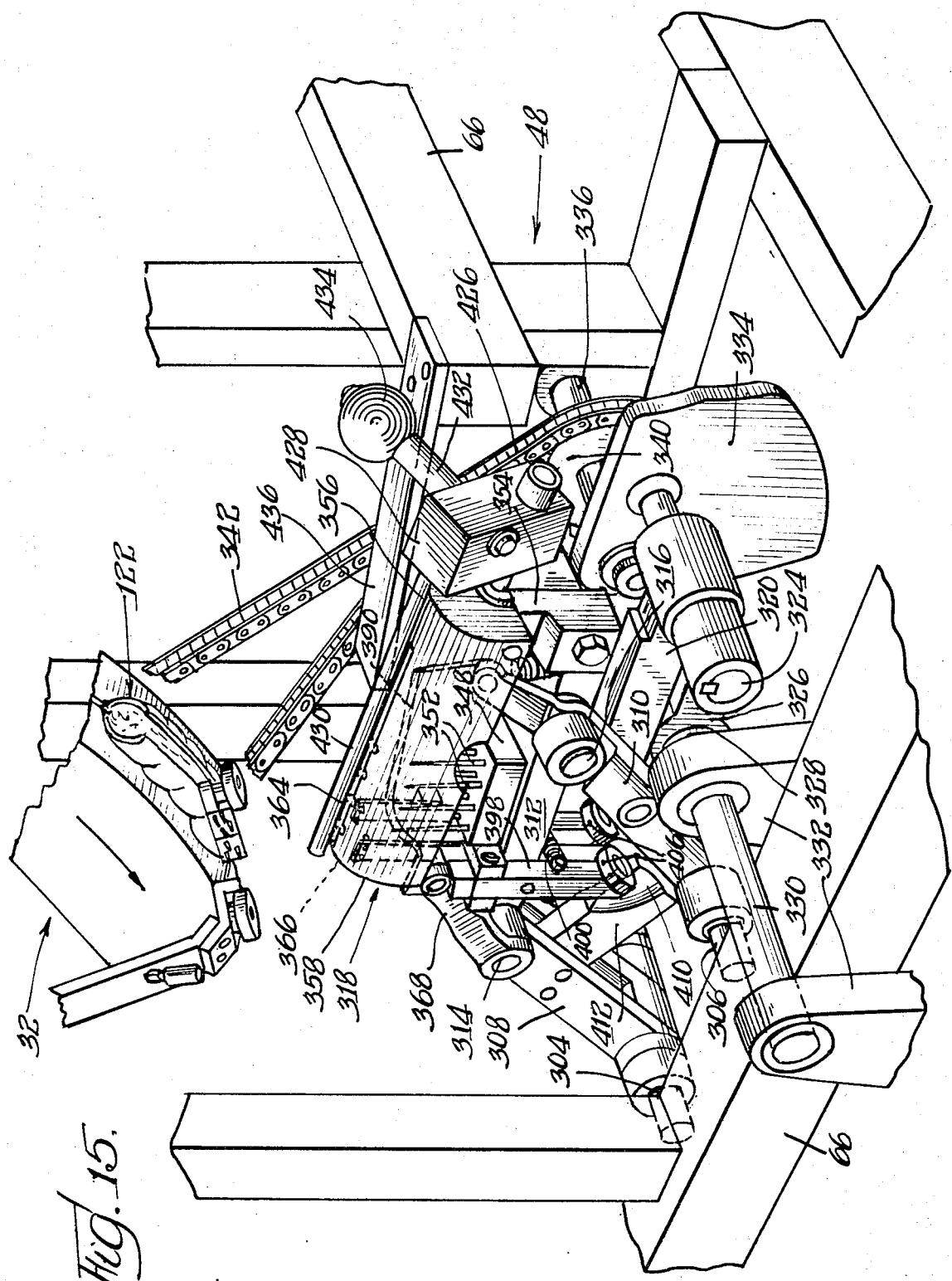

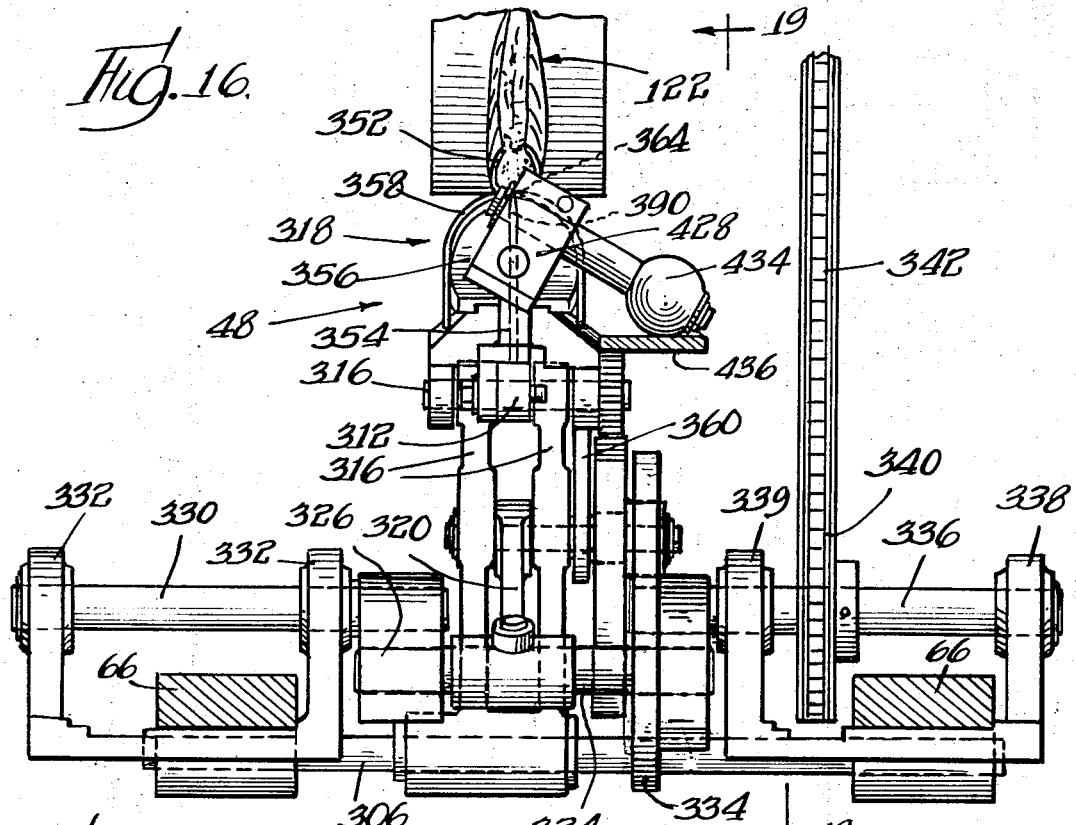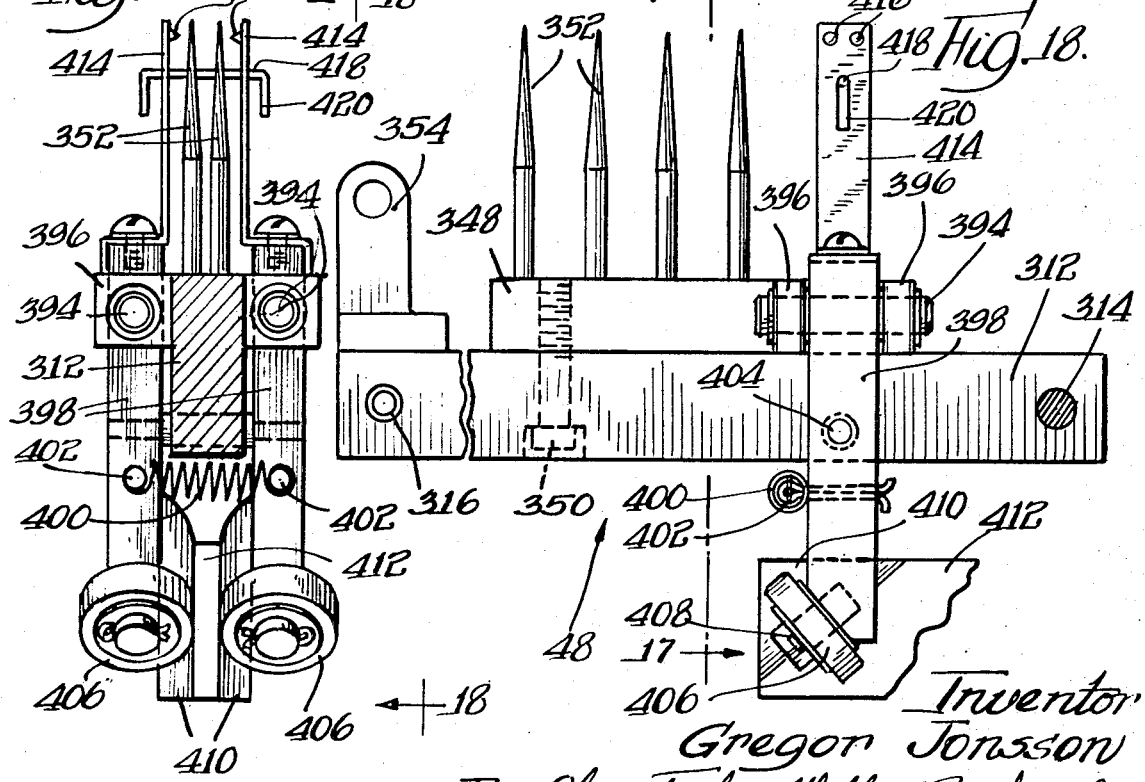

March 2, 1971 G. JONSSON 3,566,437

SHRIMP PROCESSING MACHINE AND METHOD

Filed Dec. 16, 1968 12 Sheets-Sheet 9

Inventor
Gregor Jonsson
By: Olson, Trexler, Wolters & Bushnell, attys.

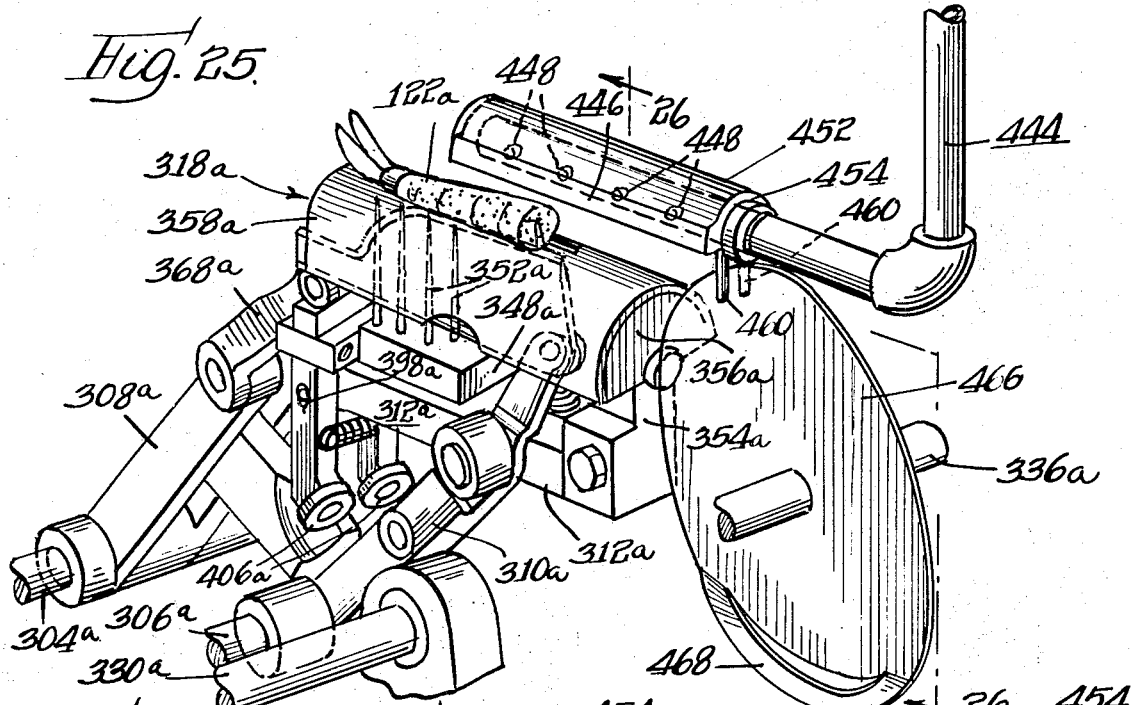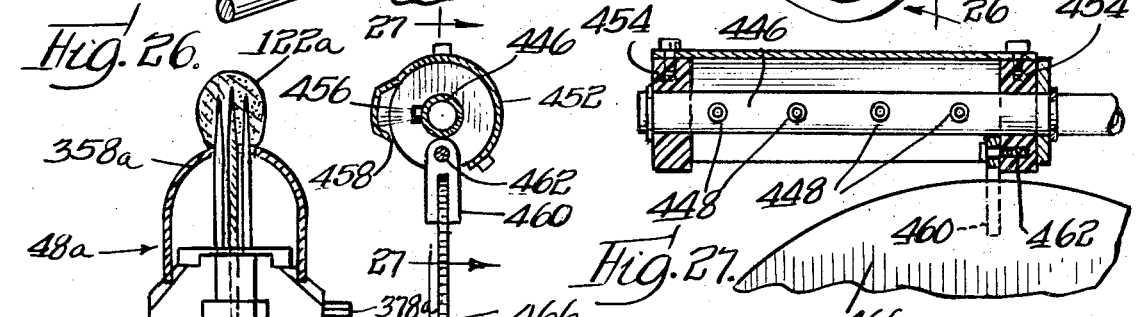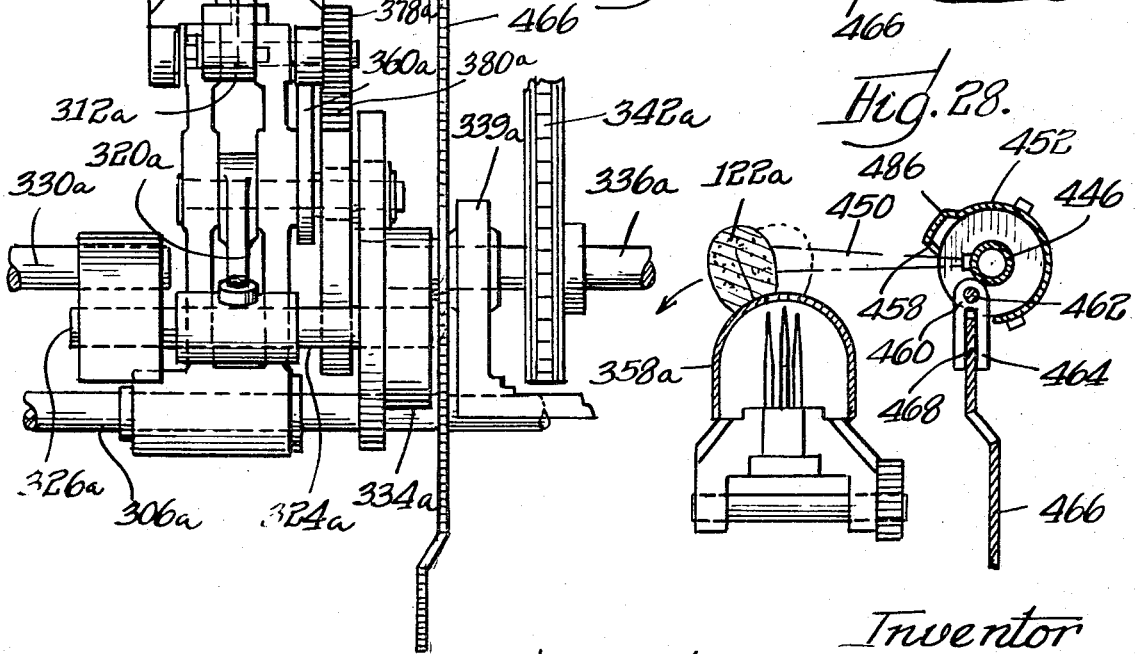

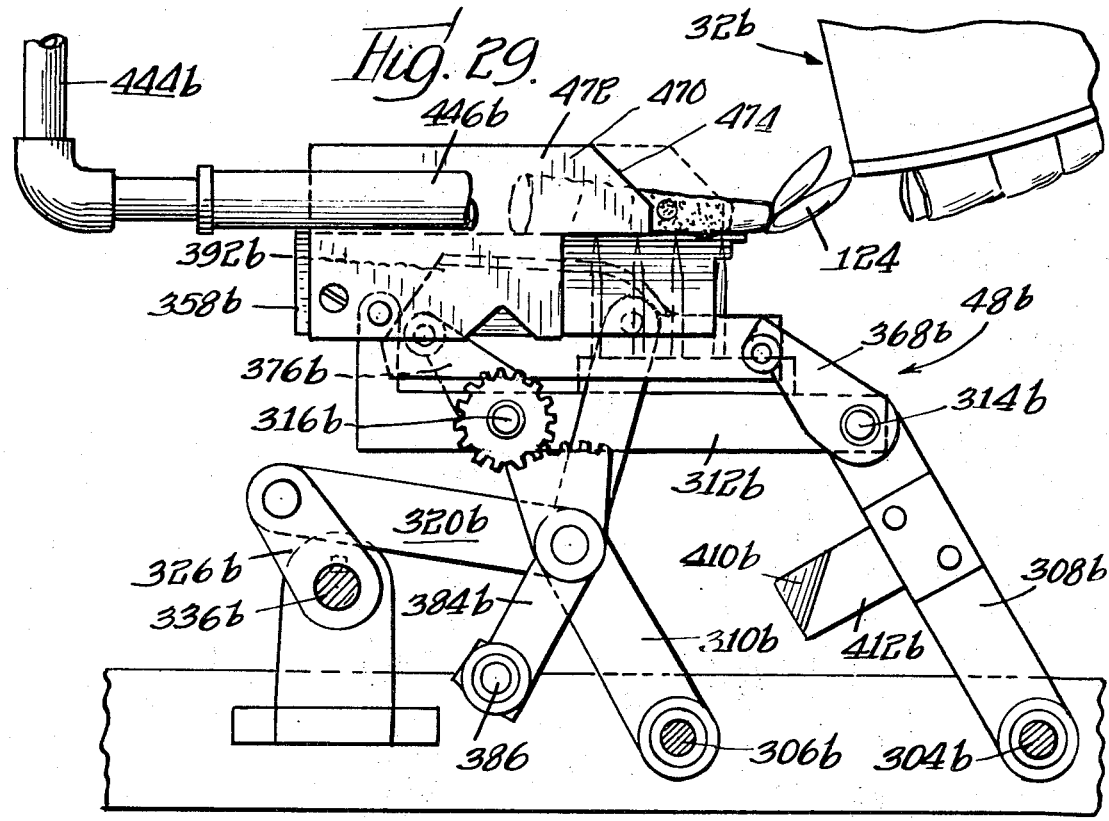
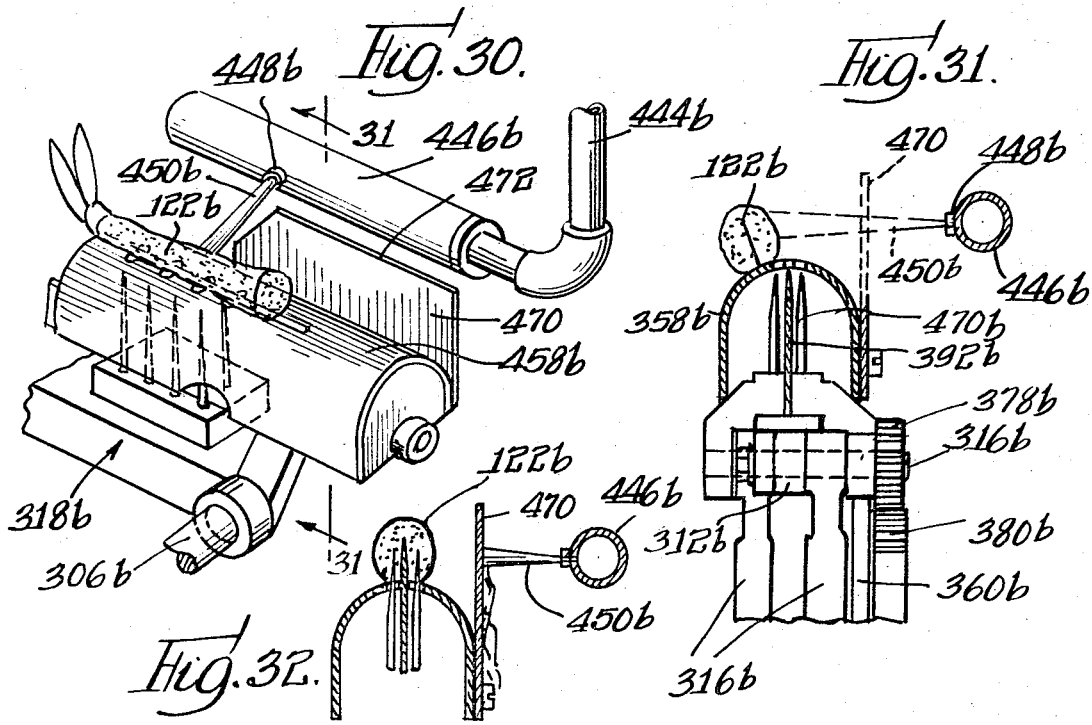

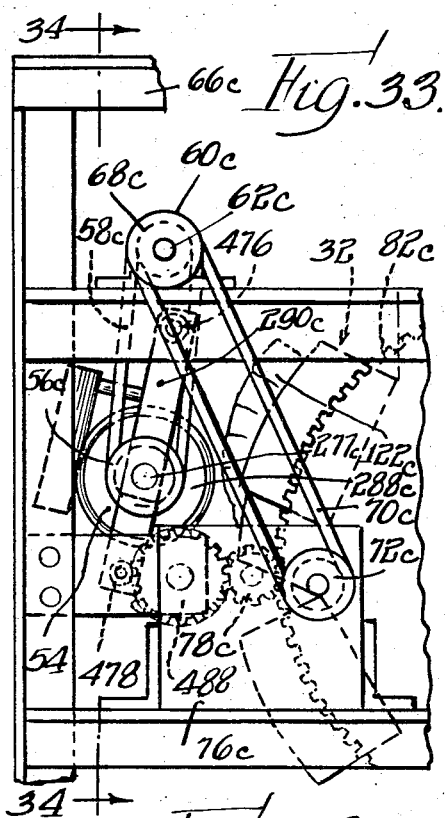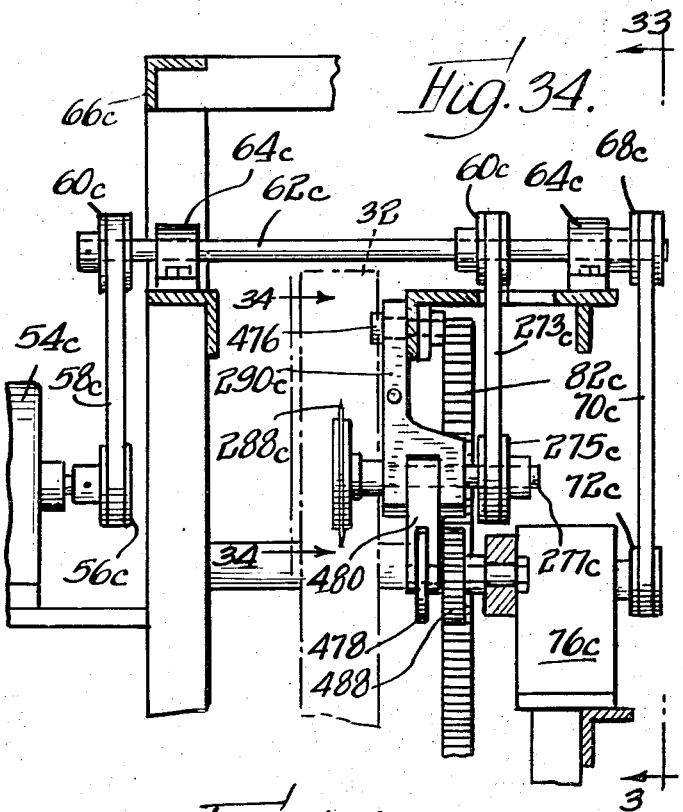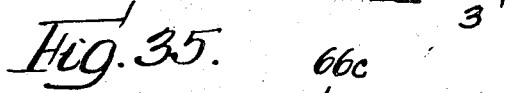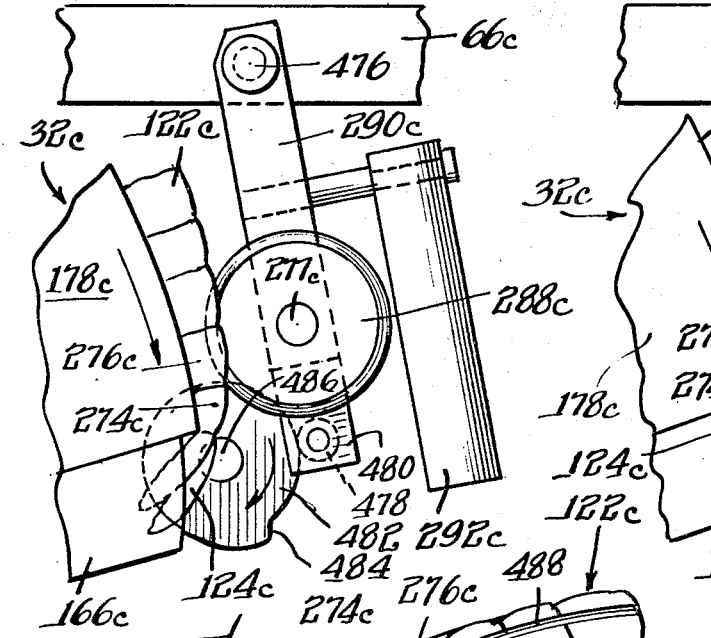

United States Patent Office 3,566,437
Patented Mar. 2, 1971

3,566,437
SHRIMP PROCESSING MACHINE AND METHOD
Gregor Jonsson, Lake Forest, Ill. (% Gregor Jonsson Associates Inc., 1520 Berkeley Road, Highland Park, Ill. 60035)
Filed Dec. 16, 1968, Ser. No. 783,807
Int. Cl. A22c *29/00*
U.S. Cl. 17—48
30 Claims

ABSTRACT OF THE DISCLOSURE

A shrimp processing machine and method including an intermittently operating conveyor from which beheaded shrimp are pulled tail first by sets of clamps on a rotary wheel turning at a uniform rate. The shrimp shells and part of the meat are slit, and the sand vein is removed by the rotary brush. The intermittently operating conveyor mechanism is driven from the rotary wheel by a Geneva drive mechanism.

The shrimp meat is finally removed from the shell by a shell separating mechanism including a plurality of spikes which penetrate the meat and move forward at a more rapid rate than the peripheral movement of the shells as carried by the clamps on the wheel for a short distance, partially to separate the meat from the shell, the spikes then moving rearwardly relative to the direction of the wheel positively to pull the meat from the shell. Positive stripping means is provided to remove the meat from the spikes, and either a mechanical wiper or water jets move the meat from the stripper to a utilization station.

---

The processing of shrimp by hand, including removal of the sand vein and separation of the shrimp meat or flesh body from the shell, is time-consuming and quite uneconomical at present labor rates. Efforts have been made heretofore to provide machines for effecting this operation, and among the most successful of these have been some of my own machines as disclosed and claimed in my prior U.S. Pats.: 2,784,450; 2,859,761; 3,122,777; 3,159,871; 3,214,789; 3,238,561; 3,247,542; and 3,277,517.

Under most conditions and with fresh shrimp, the machines disclosed in the foregoing noted patents have worked quite satisfactorily. However, under present market conditions, it is common for shrimp to be caught in extremely hot climates. For example, in areas off the coast of India, Pakistan, and Kuwait, the shade temperature may reach 100 to 125 degrees F., and there is little or no shade. Shrimp catching starts as early as 4:00 a.m., and by 2:00 p.m. the first shrimp would be spoiled if it were not iced. Thus, icing is absolutely essential, and shrimp boats may stay out for ten to fourteen days at a time. The shrimp cannot be satisfactorily separated from the shell while frozen, partly due to freezing of liquid between the shell and body. If the shrimp is thawed quickly, rigor mortis has not passed, and the meat still cannot be separted from the shell properly.

It is possible to soak the frozen shrimp in melting ice for 24 hours, and then to process the shrimp. Something on the order of 10,000 pounds per hour of shrimp must be thawed in turbulent water, and with existing machines it has been necessary to have 50,000 pounds of shrimp thawed for a day's operation, with another 50,000 pounds of shrimp thawed for the following day's operation, whereby it is necessary to thaw and store 100,000 pounds of thawed shrimp.

When shrimps are not processed properly, the flesh becomes somewhat soft. It is difficult to remove this soft meat from the shell, just as it is difficult to remove the rigor mortis shrimp meat from the shell.

In accordance with the present invention, I provide a shrimp processing machine and method having a shell separating station wherein a spike unit engages the meat and moves ahead at slightly faster rate than the shell, advancing something on the order of a quarter inch or so ahead of the shell for partial separation of the meat from the shell. The spikes then back up as the shell continues ahead, and the meat and shell are pulled apart.

Prior to processing at this particular station, another station has mechanism which breaks the membrane between the first and second joint of the shrimp. Two small sets of spiked clamps in the shell separating station engage the shrimp tail, whereby to pull the tail from the remainder of the shell so that the shrimp body is delivered with the tail attached. At the shell separating station a knife is brought up adjacent the spikes to cut the shrimp body open, optionally cutting part way through to produce the so-called "butterfly" shrimp, or completely through to produce the so-called "saddle" shrimp.

Thus, it is an object of the present invention to provide a shrimp processing machine and method having superior means for positively separating the shrimp meat or flesh body from the shell.

More particularly, it is an object of this invention to provide a shrimp processing machine and method wherein, after the shell has been cut open, the shrimp meat is moved ahead slightly relative to the shell, and then pulled backwards to effect positive separation of the body and the shell.

It is another object of the present invention to provide a knife operable in a shrimp shell separating station to cut into the shrimp body to produce a butterfly or saddle shrimp, as the case may be.

More particularly, it is an object of the present invention to provide a shell separating station in a shrimp processing machine and method wherein parallel rows of spikes engage the shrimp meat to move it first forwardly and then rearwardly relative to the shell as carried by a clamp mechanism to separate the meat from the shell, and wherein there further is a knife operable between the two rows of spikes to cut the shrimp body.

Other and further objects and advantages of the present invention will be apparent from the following description when taken in connection with the accompanying drawings wherein:

FIG. 1 is a perspective view of a shrimp processing machine constructed in accordance with the principles of the present invention;

FIG. 2 is an enlarged vertical sectional view taken along the line 2—2 in FIG. 1;

FIG. 3 is an enlarged vertical sectional view taken along the line 3—3 in FIG. 6, and showing a part of the Geneva drive mechanism;

FIG. 4 is an enlarged vertical sectional view taken along the line 4—4 of FIG. 3;

FIG. 5 is an enlarged vertical sectional view taken along the line 5—5 in FIG. 1;

FIG. 6 is a horizontal sectional view taken along the line 6—6 in FIG. 5;

FIG. 7 is a vertical sectional view taken along the line 7—7 in FIG. 5;

FIG. 8 is a detail vertical sectional view taken along the line 8—8 in FIG. 5;

FIG. 9 is a fragmentary, detail vertical sectional view taken along the line 9—9 in FIG. 8;

FIG. 10 is a vertical sectional view taken substantially along the line 10—10 in FIG. 7;

FIG. 11 is a fragmentary perspective view of a shrimp holding unit taken on an enlarged scale;

FIG. 12 is a cross-sectional view taken along the line 12—12 in FIG. 11;

FIG. 13 is an exploded perspective view of a portion of the mechanism of FIG. 11, being that portion of the mechanism taken along the line 14—14 of FIG. 11;

FIG. 14 is a cross-sectional view of a portion of FIG. 11 as taken along the line 14—14 in FIG. 11;

FIG. 15 is a fragmentary perspective view of the shell-removing station;

FIG. 16 is an end view of the shell-removing station taken from the right end of FIG. 15;

FIG. 17 is a vertical sectional view taken through the shrimp meat engaging spike unit substantially along the line 17—17 of FIG. 18;

FIG. 18 is a side view of the spike unit taken substantially along the line 18—18 of FIG. 17;

FIGS. 19–22 are similar views, all taken along the line 19—19 in FIG. 16, and showing the parts of the shell-removing station in various positions of operation;

FIG. 23 is an upward looking horizontal view taken substantially along the line 23—23 in FIG. 21;

FIG. 24 is a detail vertical sectional view taken substantially along the line 24—24 in FIG. 23;

FIG. 25 is a view generally similar to FIG. 15, and showing a modification of the invention;

FIG. 26 is a sectional view taken substantially along the line 26—26 in FIG. 25;

FIG. 27 is a vertical sectional view taken substantially along the line 27—27 in FIG. 26;

FIG. 28 is a view similar to a part of FIG. 26, with the water shield rocked to a different position of operation;

FIG. 29 is a side view generally similar to FIGS. 19–22, showing a further modification of the invention, and with the parts in a slightly different position relative to FIGS. 19–22;

FIG. 30 is a perspective view corresponding to the modification of FIG. 25;

FIG. 31 is a vertical sectional view taken substantially along the line 31—31 in FIG. 30;

FIG. 32 is a view corresponding to FIG. 31, but showing the parts in a different position of operation;

FIG. 33 is a fragmentary side view of the slitting station showing an improved modification thereof, the view being taken substantially along the line 33—33 in FIG. 34;

FIG. 34 is a view taken at right angles to FIG. 33 and substantially along the line 34—34 in FIG. 33;

FIG. 35 is a further fragmentary view on an enlarged scale taken from the opposite direction of FIG. 33 and substantially along the line 36—36 in FIG. 34;

FIG. 36 is a view similar to FIG. 35, showing the parts in a different position of operation; and FIG. 37 is a fragmentary perspective view showing the shrimp slit except for the last joint thereof.

Figure 19:
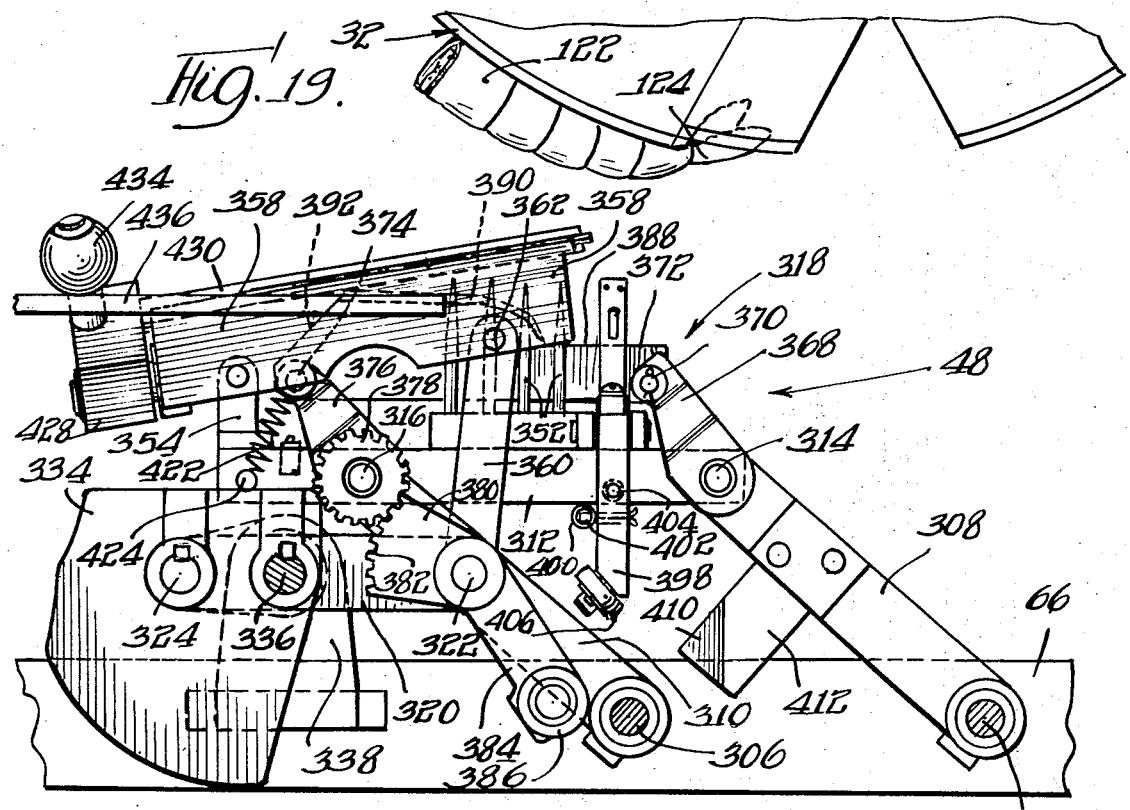
Figure 20:
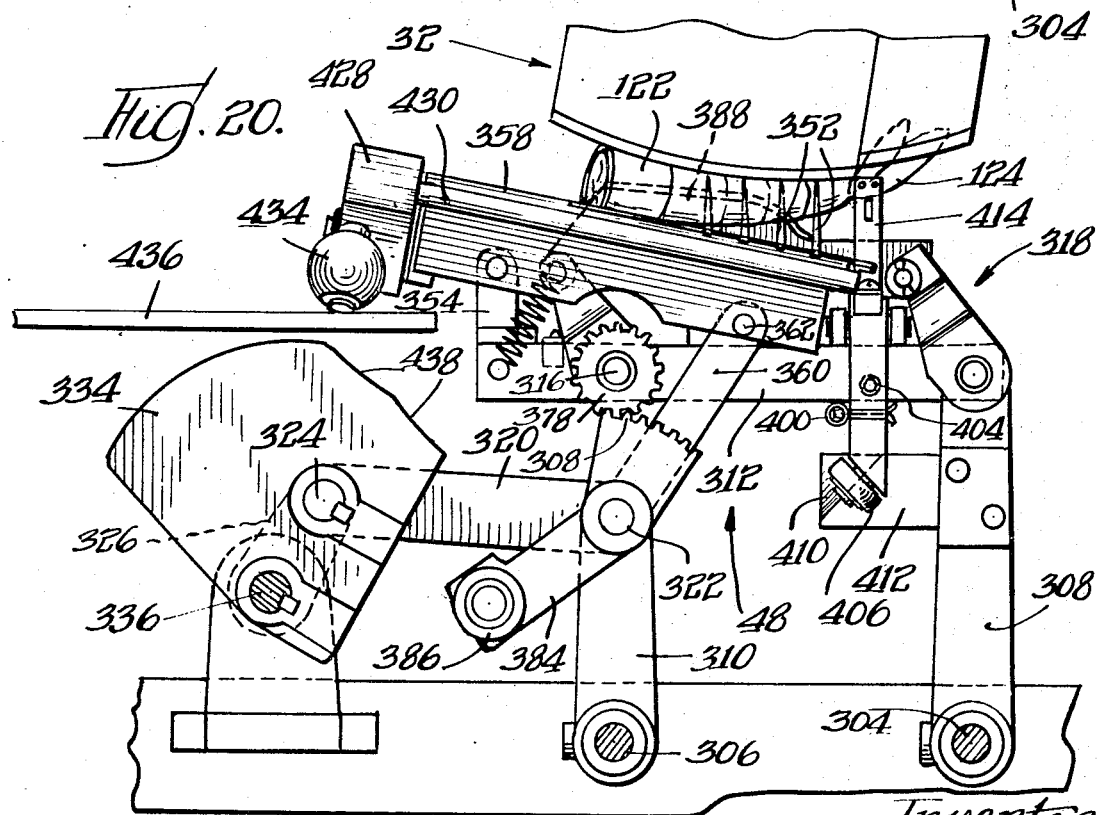

Referring now in greater particularity to the drawings, and first to FIG. 1, there is shown a shrimp-cleaning or processing machine 30 constructed in accordance with the present invention. The machine includes an annular series of shrimp holders or holding units 32 which are supported and rotated in an annular path in the machine.

With reference to FIG. 5, and particularly to FIG. 10, the shrimp holding units 32 are continuously moved at a uniform rate of speed in a clockwise direction as indicated by the arrow 34 in FIG. 10. The shrimp holding units 32 move ina closed annular path wherein the holding units are carried in succession through a sequence of working stations or zones where various significant functional operations are performed. The first such station or zone comprises a shrimp pickup or supply station 36. Successive holding units 32 moving through the shrimp pickup station 36 pick up individual shrimps supplied to the station 36 by an endless conveyor 38 moving in synchronism with the holding units, but intermittently rather than at a continuous uniform rate. From the pickup station 36 each holding unit 32 passes through a main shell clamping station 40 where the under-belly of the shrimp previously picked up is firmly clamped in the holding unit.

Immediately after it is clamped along its under-belly or ventral side in the staiton 40, each shrimp is carried through a shell disjointing station or zone 42 wherein the shell of the shrimp is disjointed by opposed longitudinal forces applied to the shrimp in a manner to be set forth hereinafter.

After the shell of each shrimp is disjointed near the tail of the shrimp in the zone 42, the shrimp is carried by the holding units 32 onto a shell ripping and deveining station 44 where the shell of the shrimp is longitudinally ripped open along its dorsal side. At this time the sand vein of the shrimp is removed.

Each shrimp is carried from the shell ripping and deveining station 44 to cleaning station 46 where the meat or body of the shrimp is washed and scrubbed to remove debris.

After the shrimp have been cleaned and washed at the station 46, they are carried onto a shell-removing station 48 of improved construction and forming a major portion of the present invention. This shell-removing station will be described in greater detail hereinafter. The meat or body and also the tail of each shrimp are briefly moved ahead faster than the respective holding unit 32, and then are moved rearwardly of the respective holding unit (considering the direction of movement of the holding units) while movement of the main portion of the shrimp shell is continued, and thereby to slip the shrimp shell longitudinally off the meat or body of the shrimp, leaving the shrimp tail attached to the body. The cleaned body and tail of each shrimp are dropped to the bottom of the machine for subsequent utilization, as will be brought out in greater detail heerinafter. The main portion of the shrimp shell, after such separation, is carried on to a shell release station 50 where the shrimp shell is released from the respective holding unit 32, which holding unit then passes by a cleaning brush 52 before again reaching the shrimp pickup station to pick up any additional shrimp.

Reference has been made to movement of the shrimp holding units through an annular path, such movement as well as movement of the other moving parts of the machine being effected by an electric motor 54 (FIGS. 5 and 7) having a pulley on the output shaft thereof driving a belt 58 which in turn drives a pulley 60 fixed on a jack shaft 62 journaled in suitable bearings 64 supported from the frame 66 of the machine 30. At the opposite end from the pulley 60 the jack shaft 62 carries a pulley 68 which operates through a belt 70 to drive a pulley 72. The pulley 72 is fixed on a shaft 74 extending from the gear box 76 suitably mounted on a machine frame 66. The gear box 76 has an output shaft 77 (see also FIG. 6) with a spur gear 78 fixed thereon and driving a large ring gear 80 formed on the periphery of a flywheel or rotor 82 in which the holding units 32 are suitably mechanically mounted. Many of the remaining moving parts of the machine are driven from this ring gear as will be brought out hereinafter.

In particular, and continuing to refer to FIG. 5 (right side thereof) and FIG. 6, and also to FIGS. 3 and 4, the ring gear 80 drives a spur gear 84 fixed on a shaft suitably journaled in a bracket 86 supported by the machine frame and having at its opposite end a bevel gear 88 which drives a bevel gear 90 fixed on a cross shaft 92.

The cross shaft drives the endless conveyor 38 free of shocks and vibration through a Geneva drive mechanism 94 comprising a carrier disc 96 having a pin 98 extending axially thereof from a location near the periphery of the disc 96. The disc carries the usual Geneva idler or lock 100 in the form of a disc or cylinder with an arcuate section removed therefrom at 102, as is well known in Geneva drive mechanisms.

The well known Geneva wheel 104 has the usual radial slots 106 successively receiving the pin 98 (which preferably has a roller thereon), and also the interleaving concave arcuate sections 108 for receiving the idler or Geneva lock 100. The Geneva wheel 104 in the present instance has six radial slots 106, and hence it will be quickly turned one-sixth of a revolution for each revolution of the driving disc 96, the Geneva wheel being firmly locked in position between such rapid incremental advances. Thus this Geneva lock device may be aptly described as a self-locking, intermittent transfer mechanism for controlling the intermittent movement of a shrimp conveyor, about to be described.

The Geneva wheel 104 is rotatably mounted on a shaft 110 suitably fiixed to parts of the machine frame 66. The Geneva wheel is fixed to a tube 112 rotatable with the Geneva wheel and concentric with the shaft 110. The opposite end of the tube 112 is fixed to a drive cog 114 driving a chain 116 (see also FIG. 1) forming a part of the endless conveyor 38. Various additional idler cogs 118 are suitably rotatably supported from the machine frame to guide the chain 116 in the reentrant pattern illustrated generally in FIG. 1.

In addition to the chain 116, the conveyor 138 includes a succession of open-ended, V-shaped troughs 120 into which beheaded shrimps 122 are loaded by hand from a conveyor belt 123 disposed adjacent the machine 30. The shrimps are loaded with the tails 124 thereof extending from the troughs 120 in the direction of the holding units 32 and of the shrimp pickup station 36. The troughs 120 successively stop in alignment with the shrimp pickup station 36 as they are intermittently moved by the Geneva mechanism 94.

As may be seen particularly in FIGS. 11 and 12, each shrimp holding unit or holder 32 comprises a central support frame or member 160 securely mounted on the flywheel 82 by means such as studs 126 and spacers 162.

An inner pivot support shaft 164 mounted in the support frame 160 of each shrimp holder 32 cantilevers forwardly with respect to the normal direction of rotary movement of the holder to provide pivotal support to a pair of mutually opposed shrimp tail clamping jaws 166 biased toward each other by a spring 168. Two cam followers 170 fixed to the respective tail clamping jaws 66 project radially inwardly into coacting relation to two opposed stationary cams 172 which operate on the cam followers to effect synchronization of movement of the tail clamping jaws toward and away from one another as an incident to orbiting of the corresponding shrimp-holding unit 32 in its annular path.

As each shrimp-holding unit 32 approaches the shrimp pickup station 36, the tail clamping jaws 166 of the unit are held apart from each other by the action of the cams 172 on the associated cam followers 170. Hence, upon entering the shrimp pickup station 136, the tail clamping jaws 166 of each unit 32 receive therebetween the tail 124 of a shrimp 122 moved into the pickup station in synchronism with the shrimp holding unit. Upon moving into embracing relation to a shrimp tail 124 in the pickup station 36, the tail clamping jaws 166 are swung toward one another by the spring 168 as allowed by the cam followers 170 on the cam 172, and thereby to clamp the shrimp tails to pull the shrimps from the individual troughs 120 of the conveyor 38.

As the shrimp 122 is clamped by its tail 124 in the pickup station 136 and positively pulled by the jaws 166 into the main shell clamping station 40, the under-belly or ventral side of the shrimp is clamped forwardly of the shrimp tail along the major longitudinal portion of the shrimp by a pair of opposed main shell clamping jaws 178 provided on each holding unit 32.

The two main shell-clamping jaws 178 of each unit 32 are swingably supported on an outer pivot shaft 180 mounted in the central support frame 160 of the holding unit. Two arcuate main shell-engaging portions 182 of the respective jaws 178 confront each other in overlying relation to an arcuate shrimp support surface 184 forming a portion of the central support frame or member 160. It will be noted that the shell-engaging portions 182 are notched out at 185 to clear the rear body portion adjacent the tail. These shell-engaging portions 182 are continuously urged aggressively toward each other by spring means 186 encircling the main jaw support shaft 180. Movement of the main clamping jaws 78 of each holding unit toward and away from each other in synchronism with rotation of the holding unit is controlled by two stationary inner cams 188 which coact with cam followers 190 fixed to the respective jaws 178. A tail deflecting element 196 is fixed to the support frame 160 of each unit 32 to occupy a position in which the deflecting element extends outwardly between the tail clamping jaws 166 and the adjacent ends of the main shell clamping elements 182, to aid in deflecting the shrimp tail away from the main portion of the shrimp shell as the latter is removed from the flesh body or meat and tail of the shrimp in the station 48 in a manner to be described hereinafter. The longitudinal portion of a clamped shrimp which extends over the tail deflecting element 196 from the tail clamping jaws 166 to the main clamping element 182 is not clamped by either the jaws 166 or the jaws 178.

As previously indicated, the method and machine provided by this invention serve to remove the main portion of the shell of individual shrimp from the body of shrimp flesh or meat, leaving the shrimp tail intact and attached to the flesh body of the shrimp. This necessarily involves a disconnection and separation of the main portion of the shell of each shrimp from the tail of the shrimp which is left attached to the flesh body thereof.

As will be seen particularly in FIG. 12, the main portion of the shell of the shrimp, which is to be separated from the tail and removed from the flesh body of the shrimp, is clamped along its under side by the main shrimp jaw-clamping or shell-engaging portions 182. The meat or flesh body of the shrimp is identified by the numeral 128, while the shell of the shrimp is identified generally by the numeral 130. The main longitudinal portion of the shrimp shell which is clamped by the clamping elements 182 and subsequently removed from the flesh body is identified by numeral 132.

As each shrimp 122 is carried through the shell disrupting or disjointing station 42, a portion of the shrimp shell located adjacent the tail 124 thereof is stretched or tensioned longitudinally with respect to the shrimp until the strength of the shrimp shell is permanently disrupted. Preferably this is done in a manner which disjoints the shrimp shell 130 near the shrimp tail 124. Moreover, the permanent disruption of the strength of the shrimp shell near the tail of the shrimp is effected by longitudinal tension force applied to the shell 130 in a manner which effectively avoids substantial weakening of the adjacent portion of the flesh body of the shrimp which holds the shrimp tail attached to the flesh body of the shrimp.

The portion of the shrimp shell which is to be disrupted is strained beyond the point or condition of disruption by tension forces applied to the shrimp shell 130 in a manner that substantially avoids compressive crushing of the shrimp shell and damage by compression to the adjacent portion of the flesh body 128 of the shrimp.

To this end, longitudinal tension force is applied to each shrimp shell through non-slip connections made to the shrimp shell 130 in a manner which minimizes compressive loading of the shrimp shell.

In the preferred construction, shell tensioning forces are applied to each shrimp shell 130 by non-slip shell clutches to be described, and carried by two opposed clutch jaws 208 and 210 pivotally supported on two pivot pins 212 and 214 mounted on the lower edges of the respective main jaws 178.

Non-slip connections are made to each shrimp shell 130 by tubular shell-engaging elements or shell clutches 216 and 218. One shell-engaging element or clutch of each of the two pairs of clutches 216, 218 is carried by each of the two clutch jaws 208, 210 for engagement with a shrimp shell.

As seen particularly in FIG. 12, the two clutch jaws 208 and 210 are formed as generally C-shaped mirror images of each other, and extend from the support pivots 212, 214 outwardly around the two main clamping jaws 178. The outer ends of the clutch jaws are turned toward each other to confront opposite sides of the position occupied by a shrimp 122 clamped on the holding unit in the manner described.

The first pair of shell connecting elements or clutches 216 has stationary positions on the respective clutch jaws 208, 210 and is located on the jaws 208, 210 between the second pair of clutches 218 and the tail clamping jaws 166 to engage opposite sides of a shrimp shell 130 near the tail clamping jaws 166.

Another pair of shell connecting elements or clutches 218 is formed on two levers or dogs 220 swingably mounted on the respective clutch jaws 208, 210 by pivot pins 222. Each lever or dog 220 is urged by a spring 224 to a normal position in which the clutch 218 on the dog 220 abuts against the adjacent clutch 216 as shown in FIG. 11.

Each dog-biasing spring 224 preferably has a central loop 226 (FIG. 13) encircling a projecting portion of the dog pivot pin 222 to hold the spring in place. Opposite ends of each spring 224 extend from the central spring loop 226, and engage respectively an anchoring stud 228 on a corresponding one of the clutch jaws 208, 210, and a cam follower button 230 secured by a screw 232 (FIG. 14) to the corresponding dog 220.

Each cam follower button 230 preferably is formed of a suitable resinous plastic material, such as nylon, and is held against rotation on its clutch dog 220 by a small pin 234 extending outwardly from the corresponding clutch dog 220 into one of two openings 236 in the follower button. Each follower button 230 has a generally circular shape truncated along a generally straight inner edge 238 which defines a groove 240 receiving the adjacent end of the coacting spring 224. An arcuate peripheral edge 242 of each follower button 230 projects outwardly beyond the adjacent portion of the corresponding dog 220 for engagement by a coacting cam, as will be explained hereinafter.

Each clutch dog 220 functionally consists of a bell crank swingable about its support pivot 222, and having two legs, one of which supports the corresponding cam follower button 230, and the other of which is constructed to define the corresponding shrimp shell clutch 218.

Each of the shell clutches 216 (see particularly FIGS. 13 and 14) comprises two needle-sharp anchoring tines or short spikes 244 mounted on the corresponding one of the clutch jaws 208, 210 to project toward the adjacent shell 130 of a shrimp 122 clamped on the corresponding holding unit 32. Preferably, one of the tines or spikes 244 on each clutch 216 is located radially outwardly of the other spike with reference to the axis of the flywheel 82, the flywheel axis being identified by the numeral 246.

Each of the spikes 244 is formed of a very hard metal and, as illustrated in FIG. 14, comprises a cylindrical base 248 securely mounted in the coacting clutch jaw.

Each of the shell-engaging clutches 218 (see particularly FIG. 13) comprises four needle-sharp tines or spikes 250 located in a generally trapezoidal pattern with two of the spikes 250 positioned radially outward with respect to the other two elements 250. The two spikes 250 which are closest to the adjacent clutch 216 have a spacing from one another that is greater than the spacing from each other of the two remaining spikes 250 which are more remote from the adjacent clutch element 216.

The two clutch jaws 208, 210 are continuously urged away from the main clamping jaws 178 by two helically spiraled compression springs 255 which force the respective clutch dogs into engagement with two motion-limiting abutments 260 carried by the respective clamping jaws 178.

As will appear presently, the two springs 255 not only serve to hold the jaws 208, 210 apart to receive the shrimp therebetween, but also serve advantageously to minimize the compressive load subsequently applied to a shrimp as its shell is stretched and tensioned to disrupt its strength.

Before each shrimp 122 is fully clamped in a holding unit 32, the two pairs of clutches 216, 218 on the holding unit are spaced apart out of engagement with the shrimp. As the shrimp is carried, after clamping, on into the shell disjointing zone 42, two outboard cam followers 254 on the clutch jaws 208, 210 move into engagement with two opposed cams 256 (FIG. 10), which together form a constrictive throat through which the two followers 254 must pass in the zone 42.

The cams 256 swing the clutch jaws 208, 210 toward each other, causing the spikes 244 of the clutches 216 and the spikes 250 of the clutches 218 to puncture opposing portions of the intervening shrimp shell 130. Due to their small size and needle-like sharpness, the spikes 244 and 250 of the clutches 216, 218 establish firm non-slip connection with adjacent portions of a shrimp shell 130 without subjecting the shrimp shell to compressive loads which would damage the underlying flesh body of the shrimp.

The pivot pin 222 for each swingable clutch dog 220 is located with reference to the position of the shrimp on the corresponding holding unit 32 forwardly of the shrimp shell clutch 218 on the dog 220. Stated otherwise, the position of each clutch dog pivot 222 in relation to the corresponding clutch 218 is such that the clutch 218 occupies, with reference to the central longitudinal plane of the corresponding holding unit 32, a position between the dog pivot 222 and the adjacent clutch 216.

This positional relationship of each clutch dog pivot 222 to coacting structure is of advantage in that it causes the outward reaction of a shrimp shell on the corresponding clutch 218, as the clutch 218 is engaged with the shrimp shell, to supplement the action of the coacting spring 224 to hold the clutch 218 in its normal position in which its structure abuts against that of the adjacent clutch 216. Hence, even though each clutch dog 220 is normally held in its normal position only by the yieldable force of a spring 224, the clutch dog 220 is firmly stabilized in its normal position during engagement of the corresponding clutch 218 with the shrimp shell by virtue of the effect which the reaction of the shrimp shell on the clutch 218 has in stabilizing the dog 220 in its normal position.

As will be seen in FIG. 11, the positional relationship of the shell clutches 216, 218 of each holding unit 32 toward the components of the holding unit is such that the spikes 244 of the clutches 216 engage a shell segment 274 (FIG. 5) adjacent the shrimp tail 124, while the spikes 250 of the clutches 218 engage the shell segment 276 immediately adjacent the shell segment 274. The two shell segments 274, 276 engaged by the two pairs of clutches 216, 218 are joined to each other by a shell joint 278.

After the clutches 216, 218 of each holding unit 232 are engaged with a shrimp shell by the action of the cam 256 on the cam followers 254, the continuing movement of the holding unit brings the cam followers 230 into engagement with a second pair of opposed cams 280 (FIG. 10). The two cams 280 move the two cam followers 230 on the clutch dogs 220 toward each other. This movement of the followers 230 swings the two clutch dogs 220 of each holding unit 32 in opposite directions away from the normal positions of the dogs 220 to effect movement of the two corresponding shell clutches 218 away from the adjacent shell clutches 216 and away from the clamped tail 124 of the shrimp.

Swinging of the dogs 220 as just described has the effect of applying to the clutched shrimp shell segment 276 tension force acting longitudinally along the corresponding shrimp away from the clamped and clutched tail end portion of the shrimp. The longitudinal tension force applied to the clutched shrimp shell segment 276 is opposed by cumulative restraining forces applied to the shrimp tail 124 which is clamped by the jaws 166 and the adjacent shrimp shell segment 274, which is engaged by the clutches 216. As a consequence, the clutches 218 apply to the shrimp shell joint 278 (FIGS. 5 and 24) a longitudinal tension force acting forwardly with respect to the shrimp, and the tail jaws 166 and the clutches 216 apply to the shrimp at the tail side of the shell joint 278 an opposing tension force acting rearwardly with respect to the shrimp.

The forward displacement of the clutches 218 with respect to the clutches 216 and tail clamping jaws 166 is sufficient to cause disruption of the strength of the shrimp shell between the two pairs of clutches 218, 216 by the tension applied to the intervening portion of the shrimp shell. Thus, there is an effective rupturing or disjointing of the intervening shell joint 278.

After the shell of the shrimp is disjointed in the manner described, the cam followers 230 soon pass beyond the cams 280, which are of rather short duration, allowings the dogs 220 to return to their normal position. The cam followers 254 pass beyond the cams 256, allowing the springs 255 to swing the clutches 216, 218 out of engagement with the shrimp shell.

It will be appreciated that the action of the cams 280, in moving the cam followers 230 toward each other, to produce the desired swinging action of the dogs 220, tends to press the clutches 216, 218 against opposite sides of the coacting shrimp. However, this action of the cams 280, in tending to move the clutch jaws 208, 210 toward each other, is opposed by the springs 255 which act against the came 256. Because of the action of the springs 255, it is not necessary that the shrimps sustain the full load of the cams 280 in moving the cam followers 230 toward each other. The result is to minimize the compressive load on the shrimp, thus avoiding damage to the flesh body of the shrimp.

From the shell disrupting or disjointing zone 42, each shrimp is carried by the continuing movement of its supporting unit 32 into the shell-ripping and deveining station 44 where the dorsal start of the shrimp shell 130 is ripped open and the sand vein 286 (FIG. 12) of the shrimp is dug out by a rotary serrated element or saw 288 (FIGS. 7 and 10). The element 288 is supported by a swingable arm 290 which pivots about the jack shaft 62. A pulley 271 fixed on the jack shaft adjacent the pulley 60 acts through a belt 273 to drive a pulley 275 which is fixed on the same shaft 277 as the serrated element 288.

A pair of sheet metal shrimp centering guides 279 is carried by a bracket 278 supported from a suitable part of the machine frame with the guides 279 lying on opposite sides of the serrated element or cutter 288 to insure proper centralization of the shrimp at that position. A weight 292 is mounted from an arm 293 to swing the cutter or serrated element 288 into engagement with a shrimp shell, inward movement being limited by a positive stop (not shown).

From the shell ripping and deveining station 44, each shrimp is carried to the debris removing station 46, where the open dorsal side of the shrimp is scrubbed by a rotary brush 300 (FIGS. 5, and 7–10) with the aid of a jet of water from a nozzle 302 to wash away the debris, leaving the shrimp clean.

The brush 300 is mounted on a swingable arm 281 which is swingably mounted about an idler shaft 283 fixed in a suitable part of the machine frame 66. The arm 281 is of sufficient weight to hold the brush against the shrimp, and a stud 285 projecting from the machine frame 66 is engageable with the upper or butt end of the arm 281 to limit inward swinging thereof against the shrimp. A spur gear 287 is rotatable about the shaft 283, and is driven by or in synchronism with the spur gear 78 from the gear box 76. The spur gear 287 in turn drives an idler gear 289 journaled on a shaft 291 carried by the swingable arm 281, and the gear 289 in turn drives the gear 293 fixed on a shaft 295 journaled at the lower end of the arm 281 carrying and driving the brush 300.

Important matters of the invention reside in the shell-removing station 48, and this will be passed for the moment for description in greater detail hereinafter.

After each unit has passed the shell removing station 48, it reaches the shell releasing station 50, where the empty shrimp shell 130 is allowed to drop off on to a disposal chute 442, whereupon the empty unit 32 passes by the cleaning brush 52 to the pickup station 36 to continue the cycle. The brush 52 is fixed on a shaft with a gear 297 driven by the previously mentioned gear 84.

The shell removing station can be seen in some detail in FIGS. 5, 7, and 15–24. Among these, attention is directed first to FIGS. 5, 7, 15, 16, and 19. Front and rear transverse shafts 304 and 306 are suitably supported from a portion of the frame 66 of the machine. Front and rear bifurcated arms 308 and 310 are respectively rockably mounted on these shafts in substantially parallel relation. At the upper ends of these arms, they support a substantially horizontal frame 312 pivoted thereon by front and rear shafts 314 and 316 respectively, the frame 312 forming a part of a carriage 318.

Intermediate the shafts 306 and 313 a connecting rod 320 is connected to the rear bifurcated arm 310 by a shaft or pin 322. The opposite end of the connecting rod 320 is journaled on a crank pin 324 which, at the left end (FIGS. 15 and 16), is fixed in the outer end of a crank arm 326 which has a hub 328 fixed on an idler shaft 330 suitably journaled in brackets 332 on the frame member 66. At the right end the crank pin 324 is fixed to a segmental cam 334 which is fixed on a shaft 336 journaled in suitable bearings in brackets 338 mounted on an appropriate one or more of the frame members 66. A sprocket 340 is fixed on the shaft 336, and is driven by a chain 342 driven by a sprocket 344 fixed on a shaft with a spur gear 346 meshing with the large ring gear 80 on the flywheel 82. Accordingly, the shaft 336 rotates at all times that the machine is in operation, and the crank pin 324 and connecting rod 320 effect fore and aft rocking movement of the carriage 318 in timed relation with the movement of the remaining parts of the machine.

A mounting base or block 348 is secured to the top of the carriage frame 312 by means such as bolts 350 extending up through the frame and threaded into the block. Two rows of long spikes 352 upstand from the block or base 348. Each row of spikes is shown as including four spikes spaced apart in the direction of travel of the holding units 32, with the two rows of spikes spaced laterally of the direction of travel.

At the rear end of the carriage frame 312 there is an upstanding bracket 354 which, at its upper end, carries a semi-cylindrical support block 356. This support block supports the rear end of a semi-cylindrical shrimp meat stripper 358. The front end of the stripper is supported at one side only thereof by an upstanding arm 360 mounted on the shaft 322 at its lower end, and pinned at 362 to the stripper at its upper end. Relatively adjacent its forward end, the stripper 358 is provided with a longitudinal slot 364 along its upper center line to provide a clearance for a knife to be mentioned hereinafter. The slot has scallops 366 along the edges thereof to provide clearance for the spikes 352.

A downwardly opening yoke or clevis 368 is pivoted on the clutch shaft or pin 314 at the front of the carriage frame 312, and at its upper end has a cross pin 370 pivotally mounting the front end of a slitter knife 372. The knife is mounted at its rear end on a cross pin 374 at the upper end of a similar yoke or clevis 376 mounted on the cross pin or shaft 316. A spur gear 378 is fixed with the yoke 376 for rocking movement therewith.

A gear sector 380 is pivoted on the shaft 322 and has the teeth 382 thereof meshing with the spur gear 316. A cam follower arm 384 extends downwardly and forwardly from the sector 380 and carries a cam follower roller 386 at its lowermost extremity. When the cam follower roller is urged forwardly, as will be brought out hereinafter, the sector 380 turns in a counterclockwise direction, thereby turning the gear 378 in a clockwise direction. This causes the yoke 376 to turn in a clockwise direction, thereby moving the knife 372 upwardly and forwardly, the yoke 368 inherently pivoting in the same manner as the yoke 376 due to their mounting about parallel axes and connection at opposite ends of the knife.

The shape of the knife can be seen in FIG. 19 (and also in FIGS. 21 and 22), and includes a forward upper edge 388 which is straight and not sharpened, and a trailing higher edge 390 which is sharpened, and which is curved at the forward edge, and which tapers down at the trailing portion as an unsharpened edge 392.

Referring now particularly to FIG. 18, near the front of the carriage frame 312 a pair of longitudinal stub shafts 394 is supported by brackets 396 forwardly of the stripper 358 and lying outboard of the frame 312. Cam follower arms 398 are pivoted on the stub shafts 394 on either side of the frame, and a coil spring 400 is stretched between spring anchors 402 on the lower portions of the cam follower arms 398 to urge the lower portions toward one another. Inwardly directed stops 404 on the cam follower arms 398 engage the sides of the frame 312 to limit inward movement of the cam follower arms 398 under the influence of the spring 400.

Diagonally disposed cam follower rollers 406 are respectively mounted at the lower ends of the arms 398, being mounted on pins 408. These rollers normally are out of engagement with, but, under certain conditions of operation to be described hereinafter, come into engagement with oblique cam surfaces 410 on a cam member 412 mounted on the arm 308 to urge the rollers 406, and hence the lower ends of the cam follower arms 398, pivotally apart.

Shrimp tail gripper members 414 extend from the upper end of the cam follower arms 398 (see also FIGS. 23 and 24), and are provided at their upper ends with inwardly directed short spikes or points 416, conveniently two on each of the shrimp tail gripper members 414. As will be brought out shortly hereinafter during a certain period in the operation of the machine, the shrimp tail gripper members 414 pivot toward one another under the influence of the cam 412, whereby to grip a shrimp tail, as shown in FIG. 23.

Adjacent the upper ends of the shrimp tail gripping members 414 these members are provided with a transverse pin 418 which extends between the gripper members 414, and has downwardly turned, depending ends 420 lying outside of these members. The pin, as best may be seen in FIG. 24, underlies the tail of a shrimp and holds it up in proper position for penetration and gripping by the points 416. Unlike the cam follower arms 398, the shrimp tail gripper members 414 are not rigid, but are capable of a certain amount of flexure. Thus, they can be arranged to move toward one another to the greatest extent for the smallest size shrimp that might be handled, and will flex to allow handling of larger shrimp without damage to the mechanism.

A spring 422 (FIGS. 19 and 20) is stretched between the cross pin or shaft 374 in the fixed pin or other suitable spring anchor 424 on the carriage frame 312 so as normally to hold the knife 372 in retracted position.

A shaft 426 extends rearwardly from the mounting block 356, and rockably mounts a bracket 428 having a rod 430 extending longitudinally along the top of the stripper 358 for sweeping across the top of the stripper to insure proper movement of the shrimp meat therefrom.

A cam follower arm 432 extends laterally from the bracket 428 near the top thereof, and at its outer end carries a rotatably mounted cam follower ball or sphere 434, preferably molded of a resinous plastic material. A flat cam track 436 is mounted on a suitable machine frame member 66, and the ball 434 rides on this track. In order to hold the follower ball 434 down against the track, a suitable spring means is provided, such as a torsion spring (not shown) about the shaft 426 acting between the block 356 and the bracket 428.

Operation of the machine, except for the shell-removing station 48, has been described hereinbefore. Operation of the shell-removing station 48 will readily be understood with particular reference to FIGS. 19–24. The carriage 318 is shown in a fully retracted position (FIG. 19) as a shrimp 122, gripped by the body and by the tail in the manner heretofore described, approaches the shell stripping station 48 in one of the holding units 32. Rotation of the shaft 336 causes the crank to advance the connecting rod 320, and thus to force the carriage 318 upwardly and forwardly to the position of FIG. 20 at which the spikes 352 extend up into the meat or flesh body of the shrimp, the cam 410 simultaneously causing the shrimp tail grippers 414 to grip the shrimp tail 124. Due to the geometry of the parts, the carriage frame 312 and the spikes 352 momentarily move at a more rapid rate than the shrimp 122 carried by the holding unit 32, whereby the shrimp meat is moved forward at a slightly faster rate than the shell (being advanced about ¼ inch ahead of the shell), thereby to separate the meat at least partially from the shell. As will be seen in FIG. 20, the knife 388 has remained at a constant height relative to the carriage frame 312, while the stripper 358, due to the geometry of its mounting, has lowered somewhat. Simultaneously, the ball 434 has moved forwardly along the flat track 436, and the rod 430 has been moved well down on the right side (the foremost part in FIGS. 19 and 20). Thus, the knife projects part way up into the meat of the shrimp.

The parts continue moving through the relative positions of FIG. 21, and it will be observed that the first possible active surfaces 438 of the cam 334 have at this time come opposite the follower roller 386, but do not engage the follower roller. When it is desired for the knife to cut most deeply into the meat, a longer arm 384 is provided so that the roller is picked up by the first surfaces 437. However, with the arm 384 shown, the cam follower 386 is not picked up until it reaches the main part of the cam as indicated at 440. This causes counterclockwise pivoting of the gear section 280, and hence clockwise turning of the gear 378 with resultant clockwise movement of the knife support arms 376 and 368. This raises the knife to its greatest extent. Meanwhile, the carriage has started to move back to its initial position, i.e., toward the left in FIGS. 19–22.

The shell continues along its way toward the right as carried by the holding unit 32, except for the trail which has been released by the tail clamping jaws 166 as pivoted by portions of the opposed stationary cams 72, the tail being held back by the tail grippers 414 along with the meat which is held back by the spikes 352. The carriage continues to move to the left back to the position of FIG. 19, and at this position the stripper 358 has raised entirely above the knife and above the spikes 352, the follower roller 386 by this time having fallen off the cam 338. Thus, the meat is now entirely free of the shell, and may possibly fall of its own volition off the side of the stripper to a collector basket as the bottom of the machine (not shown). The meat, however, is positively pushed off of the stripper if it did not fall off by return of the rod 430 to its leftmost position (the farthest away position in FIGS. 19–22).

The shrimp body gripping jaws 178 ulimately are opened by a portion of the cam 188 to drop the shell 130 down to the diagonally oriented disposal chute 442 (FIG. 10) for gravitational movement of the shell to a disposal area.

It has been found in actual field practice that the foregoing mechanism works quite well. However (bearing in mind that the knife is returned to lowered position by the spring 422), it has been found that under certain adverse conditions of operation where there may be an accumulation of shrimp material about the knife, the knife on some occasions does not fully retract. When this happens, there is an intereference between the knife and the rod 430 which is obviously undesirable. A modification of the invention is shown in FIGS. 25–28 which uses water jet means for moving the shrimp from the stripper, thus maintaining the area clean for better operation and retraction of the knife, and furthermore, precluding any possibility of a mechanical interference that could cause jamming or damage to the parts.

Most of the parts in FIGS. 25–28 are identical with those heretofore shown and described, and the same numbers as used heretofore are used to identify these parts with the addition of the suffix a to avoid prolixity of description.

The difference in FIGS. 25–28 resides in omission of the rod 430 and the accompanying operating parts, and in the addition of a water pipe 444 terminating in a manifold 446 disposed immediately opposite the position of a shrimp 122a resting on the stripper 358a. The manifold is provided with a plurality of orifices or jet outlets 448 directly opposite the position of the shrimp for emitting jets of water 450 to impinge against the side of the shrimp (FIG. 28) to displace it from the top of the stripper 358a.

Water pressure is maintained in the pipe 444 and in the manifold 446 throughout the operation of the machine. In order to keep water from spraying over to the shrimp area at unwanted times, a shield 452 of generally semicylindrical shape is positioned concentric about the manifold 446. The shield is mounted at one or both ends on plastic bearings 454 which journal it on the manifold, and the shield is provided with a flat section 456 against which the water jets 450 impinge as in FIG. 26. A drip edge or flange 458 is provided below the flat section 456.

A bifurcated cam follower 460 is pivotally pinned to the plastic bearing 454 by a pin 462 at the end of the manifold 446 relatively adjacent the supply pipe 444. This cam follower is provided with a vertical slot 464 receiving a flat plate cam 466 fixed on and rotating with the shaft 336a. The cam is flat throughout substantially its entire circumferential extent, and is provided with a single offset section 468 which encounters the cam follower 460 once for each revolution of the cam to rock the shield 452 to the position shown in FIG. 28, whereby the water jets 450 will impinge against and eject a shrimp 122a from the top of the stripper 358a. As will be appreciated, the water cannot provide a positive interference with the knife, should the knife not fully descend. Furthermore, the water keeps the area clean so that the knife is more likely to descend in each instance as it should.

A further modification of the invention is shown in FIGS. 29–31, again employing water for ejecting a shrimp and for keeping the parts clean. The parts again are similar to or identical with those previously disclosed, and similar numerals again are used, this time with the suffix b. In this instance, the water pipe 444b is connected to a manifold 446b having a single orifice or nozzle 448b for emitting a single somewhat larger water jet 450b. A rocking shield, such as disclosed heretofore, is omitted, but a shield in the nature of a flat plate 470 is provided which is fixed to the stripper 358b. This plate has a substantially horizontal upper edge 472 and a diagonal leading edge 474. The plate is positioned adjacent the stripper 358b in such position that the diagonal front edge 474 clears the water jet 450b just as the knife and spikes retract from the shrimp 122b so that the jet 450b impinges against the side of the shrimp to eject it from the top of the stripper, as in FIG. 31.

Inasmuch as the last shell segment adjacent the tail of the shrimp is preferably left on the shrimp, it is preferable not to cut or slice this shell segment. A modification of the invention for achieving this end is shown in FIGS. 33–37. Most of the parts are structurally the same as or functionally similar to those heretofore shown and described, and similar numerals are used with the addition of the suffix c to avoid prolixity of description.

The slitter 288c (which preferably is serrated like the previously disclosed slitter 288) is mounted in a bifurcated, swinging arm 290c which is mounted on a stud or shaft 476 suitably supported from the frame 66c. The slitter 288c is fixed on a rotatable shaft 277c with a pulley 275c which is driven by a belt 273c from the pulley 60c on the main jack shaft 62c.

A cam follower roller 478 is mounted in a bifurcated extension 480 of the arm 290c, and bears against a rotary came 482, being held thereagainst by the weight 292c. The cam is generally circular in outline, and has a single lobe or protuberance 484 thereon, having a relatively gradual ramp or rise, and a relatively rapid dropoff.

The cam 482 is mounted on a shaft 486, and is fixed for rotation with a gear 488 which meshes with and rides on the back side of the gear 78c on the output shaft of the gear reducer 76c. Since it is the gear 76c that drives the peripheral ring gear on the flywheel or rotor, obviously the cam 482 turns in time with the movement of the rotor, and hence with the various holding units 32c.

As shown in FIG. 35, the lobe 484 moves the slitter 488c outwardly away from the carriers 32c as the shell segment 474c moves past the slitter 288c, whereby the shell is not slit through the first segment 274c. However, the cam follower roller 478 falls off the lobe 484, and the slitter 288c then moves in to the position shown in FIG. 36, effecting slitting of the remainder of the shell. As a result, and as may be seen in FIG. 37, the shell segment 274c adjacent the tail 124c is not slit, but the remainder of the shell is slit as indicated at 488.

The specific examples of the invention as herein shown and described are for illustrative purposes only, and it will be understood that the claims provide the measure of the invention as hereinafter set forth.

I claim:

1. Apparatus for processing shrimp comprising means for holding a shrimp by the shell with the shell slit open and without exerting substantial force on the shrimp meat, means engageable with the shrimp meat, and means for moving the shrimp meat engaging means relative to the shell holding means first in one direction relative to a shrimp and then in the opposite direction to separate the meat from the shell.

2. Apparatus as set forth in claim 1 wherein the shrimp meat engaging means comprises spike means, and further including means for positively stripping the meat from the spike means.

3. Apparatus as set forth in claim 2 wherein the spike means comprises two rows of spikes spaced laterally of the shrimp and further including a knife movable between said rows of spikes to slit the shrimp meat, said spikes and said knife being extendable through said stripping means.

4. Apparatus as set forth in claim 2, and further including means for removing the shrimp meat from the stripping means.

5. Apparatus as set forth in claim 4 wherein the means for removing the shrimp meat from the stripping means comprises a pusher.

6. Apparatus as set forth in claim 5 and further including cam means for operating said pusher means, said cam means including a flat plate cam and a spherical cam follower connected to said pusher means.

7. Apparatus as set forth in claim 4 wherein the means for removing the shrimp meat from the stripping means comprises fluid jet means.

8. Apparatus as set forth in claim 7 wherein fluid is constantly supplied to said fluid jet means, and further including means for interrupting the jet.

9. Apparatus as set forth in claim 8 wherein the means for interrupting the jet comprises a shield mounted adjacent the stripping means and moving in synchronism therewith.

10. Apparatus as set forth in claim 8 and further including a shield disposed adjacent said fluid jet means, and means for moving said shield in synchronism with the movement of said shrimp meat holding means.

11. Apparatus as set forth in claim 1 wherein the shrimp meat holding means includes underlying supporting means engageable with the tail joint of a shrimp for positively positioning said tail joint and also includes means for gripping the tail joint as so supported for retaining the shrimp tail with the shrimp meat as separated from the shell.

12. Apparatus for processing shrimp comprising means for holding a shrimp by the shell without exerting substantial force on the shrimp meat, means for cutting open the shell, means for moving the holding means relatively past said means for cutting open the shell and removing the sand vein, and means operable in timed relation to the movement of said holding means for engaging the shrimp meat and urging it first in one direction of said shell relative to the direction of movement thereof, and then in the other direction to separate the meat from the shell.

13. Apparatus as set forth in claim 12 wherein the means for moving the holding means comprises means for moving the holding means along a closed path in a predetermined direction.

14. Apparatus as set forth in claim 12 wherein the means for holding the shell comprises means for gripping the shell on the ventral side thereof, and wherein the means for cutting open the shell comprises means for cutting the shell open on the dorsal side thereof.

15. The method of processing shrimp which comprises holding a shrimp by the shell with the shell slit open, engaging the shrimp meat, and urging the shrimp meat first in one direction relative to said shell and then in the opposite direction relative to said shell to separate the shrimp meat from the shell.

16. The method as set forth in claim 15 which includes engaging the shrimp meat with a plurality of spikes, stripping the shrimp meat from the spikes after separation from the shell, and thereafter moving the shrimp meat from the stripping area.

17. The method as set forth in claim 16 which comprises engaging the shrimp meat with a positive pushing means to move the shrimp meat from the stripping area.

18. The method of processing shrimp as set forth in claim 16 which includes directing a fluid jet against the shrimp meat to move the shrimp meat from the stripping area.

19. The method of processing shrimp as set forth in claim 18, and further including periodically deflecting the fluid jet away from the shrimp meat.

20. The method of processing shrimp as set forth in claim 15, and further including laterally engaging the shrimp and tail joint to position said tail joint, and gripping the shrimp adjacent the tail to retain the tail with the meat as it is removed from the shell.

21. The method of processing shrimp which comprises holding a shrimp by the shell without exerting substantial force on the shrimp meat therein, slitting the shell longituidnally of the shrimp, and thereafter urging the shrimp meat first in one direction relative to said shell and then in the opposite direction relative to said shell to separate the shrimp meat from the shell.

22. The method of processing shrimp as set forth in claim 21, which comprises slitting the shrimp shell throughout the body of the shrimp except for the shell segment immediately adjacent the shrimp tail.

23. Apparatus as set forth in claim 12 and further including means for moving the cutting means toward and away from the shell holding means in timed relation with the movement thereof to effect cutting open of the shell exclusive of the segment thereof adjacent the shrimp tail.

24. Apparatus as set forth in claim 23 wherein the means for moving the cutting means toward and away from the shell holding means comprises cam means.

25. Apparatus for processing shrimp comprising means for holding a shrimp by the shell with the shell slit open and without exerting substantial force on the shrimp meat, spike means engageable with the shrimp meat, means for relatively moving the shrimp meat engaging spike means and the shell holding means to separate the meat from the shell, means for stripping the meat from the spike means, and fluid jet means for positively removing the shrimp meat from the stripping means.

26. Apparatus for processing shrimp comprising means for holding a shrimp by the shell with the shell slit open and without exerting substantial force on the shrimp meat, spike means engageable with the shrimp meat, means for relatively moving the shrimp meat engaging spike and the shell holding means to separate the meat from the shell, means for stripping the meat from the spike, and means for positively removing the shrimp meat from the stripping means comprising fluid jet means.

27. Apparatus as set forth in claim 26 wherein means is provided for controlling intermittent functioning of the fluid flow from said jet means in sequential timed relation with respect to the functioning of said stripping means.

28. Apparatus as set forth in claim 26 wherein means is provided for intercepting the fluid flow from said jet means in sequential timed relation with respect to the functioning of said stripping means.

29. The method of processing shrimp which comprises holding a shrimp by gripping the longitudinally slit shell thereof, engaging the shrimp meat with a plurality of spikes, stripping the shrimp meat from the spikes after separation thereof from the shell, and then directing a fluid jet against the shrimp meat to move the shrimp meat from the stripping area.

30. The method of processing shrimp as set forth in claim 29, including the intermittent direction of said jet against the shrimp meat in sequential timed relation with the stripping operation.

References Cited
UNITED STATES PATENTS

| | | | |
|---|---|---|---|
| 2,987,759 | 6/1961 | Lapeyre et al. | 17—73 |
| 3,122,777 | 3/1964 | Jonsson | 17—72 |
| 3,221,363 | 12/1965 | Couret | 17—51 |

LUCIE H. LAUDENSLAGER, Primary Examiner

U.S. Cl. X.R.

17—72

UNITED STATES PATENT OFFICE
CERTIFICATE OF CORRECTION

Patent No. 3,566,437　　　　　　　　　Dated March 2, 1971

Inventor(s)　Gregor Jonsson

It is certified that error appears in the above-identified patent and that said Letters Patent are hereby corrected as shown below:

Column 1, line 42, change "2,859,761" to --2,850,761--;

Column 9, line 34, change "came" to --cams--;

Column 12, line 47, change "section 280" to --sector 380--

Column 14, line 13, change "came" to --cam--.

Signed and sealed this 24th day of August 1971.

(SEAL)
Attest:

EDWARD M. FLETCHER, JR.　　　　　WILLIAM E. SCHUYLER, JR.
Attesting Officer　　　　　　　　Commissioner of Patents